United States Patent
Giovacchini et al.

(10) Patent No.: US 10,948,022 B2
(45) Date of Patent: Mar. 16, 2021

(54) TORSIONAL TRANSMISSION ELEMENT WITH ELASTIC RESPONSE

(71) Applicant: SCUOLA SUPERIORE DI STUDI UNIVERSITARI E DI PERFEZIONAMENTO SANT'ANNA, Pisa (IT)

(72) Inventors: Francesco Giovacchini, Pisa (IT); Marco Cempini, Terricciola (IT); Nicola Vitiello, Pontedera (IT); Maria Chiara Carrozza, Pisa (IT)

(73) Assignee: SCUOLA SUPERIORE DI STUDI UNIVERSITARI E DI PERFEZIONAMENTO SANT'ANNA, Pisa (IT)

( * ) Notice: Subject to any disclaimer, the term of this patent is extended or adjusted under 35 U.S.C. 154(b) by 336 days.

(21) Appl. No.: 15/927,425

(22) Filed: Mar. 21, 2018

(65) Prior Publication Data

US 2018/0209484 A1 Jul. 26, 2018

Related U.S. Application Data

(63) Continuation of application No. 14/900,610, filed as application No. PCT/IB2014/062735 on Jun. 30, 2014, now Pat. No. 9,951,823.

(30) Foreign Application Priority Data

Jul. 1, 2013 (IT) .............................. FI2013A000156

(51) Int. Cl.
  *F16F 1/02* (2006.01)
  *F16D 3/72* (2006.01)
  (Continued)

(52) U.S. Cl.
  CPC .................. *F16D 3/72* (2013.01); *F16D 3/66* (2013.01); *F16F 1/025* (2013.01); *F16F 1/14* (2013.01)

(58) Field of Classification Search
  CPC ..... F16D 3/72; F16D 3/66; F16F 1/025; F16F 1/14
  (Continued)

(56) References Cited

U.S. PATENT DOCUMENTS

| 1,315,782 A | 9/1919 | Leggett |
| 2,049,273 A | 7/1936 | Pott |

(Continued)

FOREIGN PATENT DOCUMENTS

| EP | 1244817 A1 | 10/2002 |
| EP | 1724481 A1 | 11/2006 |

(Continued)

OTHER PUBLICATIONS

"Shock Absorber Specifications 7610 Series & 76 Series Shock Absorber Springs," https://web.archive.org/web/20050623193629/http://ikonsuspension.com/content/7610-76.html, Retrieved on Sep. 26, 2018, 3 Pages.

(Continued)

*Primary Examiner* — Greg Binda
(74) *Attorney, Agent, or Firm* — Workman Nydegger

(57) ABSTRACT

A torsional spring that can be used as a joint adapted to transmit at torsion actuation with elastic response. The torsional spring relates to a compact torsional elastic element, provided with a linear torque characteristic which is also not affected by the direction of rotation. The torsional spring is capable of attaining a high transmissible torque relative to its weight and overall dimension.

10 Claims, 2 Drawing Sheets

(51) Int. Cl.
  *F16D 3/66* (2006.01)
  *F16F 1/14* (2006.01)
(58) Field of Classification Search
  USPC .............. 464/78, 81, 85, 86, 100; 267/154
  See application file for complete search history.

(56) References Cited

U.S. PATENT DOCUMENTS

| | | | |
|---|---|---|---|
| 2,811,347 A * | 10/1957 | Cass | F16F 1/14 |
| 3,345,831 A | 10/1967 | Boole | |
| 4,671,780 A | 6/1987 | Weir | |
| 5,160,121 A * | 11/1992 | Bartholomew | F16F 1/371 |
| 5,910,720 A | 6/1999 | Williamson et al. | |
| 6,241,224 B1 | 6/2001 | Leibman | |
| 7,159,857 B2 * | 1/2007 | Janian | F16F 1/025 |
| 2008/0179799 A1 | 7/2008 | McClellan | |

FOREIGN PATENT DOCUMENTS

| | | |
|---|---|---|
| FR | 792739 A | 1/1936 |
| SU | 662760 A2 | 5/1979 |
| WO | 0118264 A1 | 3/2001 |
| WO | 2008137349 A2 | 11/2008 |
| WO | 2014125387 A2 | 8/2014 |
| WO | 2016065350 A1 | 4/2016 |

OTHER PUBLICATIONS

Hain, "The Spring Balancing of Loads," Institute of Landtechnik Basic Research the Research Institute for Agriculture Braunschweig-Volkenrode, No. 3, Jan. 1, 1952, pp. 38-50.

International Search Report from PCT Application No. PCT/IB2018/054513, dated Oct. 12, 2018.

International Search Report from PCT Application No. PCT/IB2014/062735, dated Oct. 10, 2014.

Lagoda et al., "Design of an Electric Series Elastic Actuated Joint for Robotic Gait Rehabilitation Training," Proceedings of the 2010 3rd IEEE RAS & EMBS International Conference on Biomedical Robotics and Biomechatronics, Sep. 26, 2010, pp. 21-26.

Paine et al., "A New Prismatic Series Elastic Actuator with Compact Size and High Performance," Proceedings of the 2012 IEEE International Conference on Robotics and Biomimetics, Dec. 11, 2012, pp. 1759-1766.

Pratt et al., "Series Elastic Actuators," Proceedings of the 1995 IEEE/RSJ International Conference on Intelligent Robots and Systems, 1995, pp. 399-406.

Pratt et al., "The RoboKnee: An Exoskeleton for Enhancing Strength and Endurance During Walking," Proceedings pf the 2004 IEEE International Conference on Robotics & Automation, Apr. 2004, pp. 2430-2435.

Sergi et al., "Design and Characterization of a Compact Rotary Series Elastic Actuator for Knee Assistance During Overground Walking," The Fourth IEEE RAS/EMBS International Conference on Biomedical Robotics and Biomechatronics, Jun. 24, 2012, pp. 1931-1936.

Stienen et al., "Design of a Rotational Hydro-Elastic Actuator for an Active Upper-Extremity Rehabilitation Exoskeleton," Proceedings of the 2nd Biennial IEEE/RAS-EMBS International Conference on Biomedical Robotics and Biomechatronics, Oct. 19, 2008, 8 Pages.

Torres-Jara et al., "A Simple and Scalable Force Actuator," Proceedings of 35th International Symposium on Robotics, 2004, 5 Pages.

Veneman et al., "A Series Elastic- and Bowden-Cable-Based Actuation System for Use as Torque Actuator in Exoskeleton-Type Robots," The International Journal of Robotics Research, vol. 25, No. 261, 2006, pp. 260-281.

Wang et al., "Efficient Lightweight Series Elastic Actuation for an Exoskeleton Joint," Dynamic Walking Conference, 2012, 2 Pages.

"Home," Helical Products Co., retrieved from http://heli-cal.com/ on Apr. 15, 2016, 3 Pages.

* cited by examiner

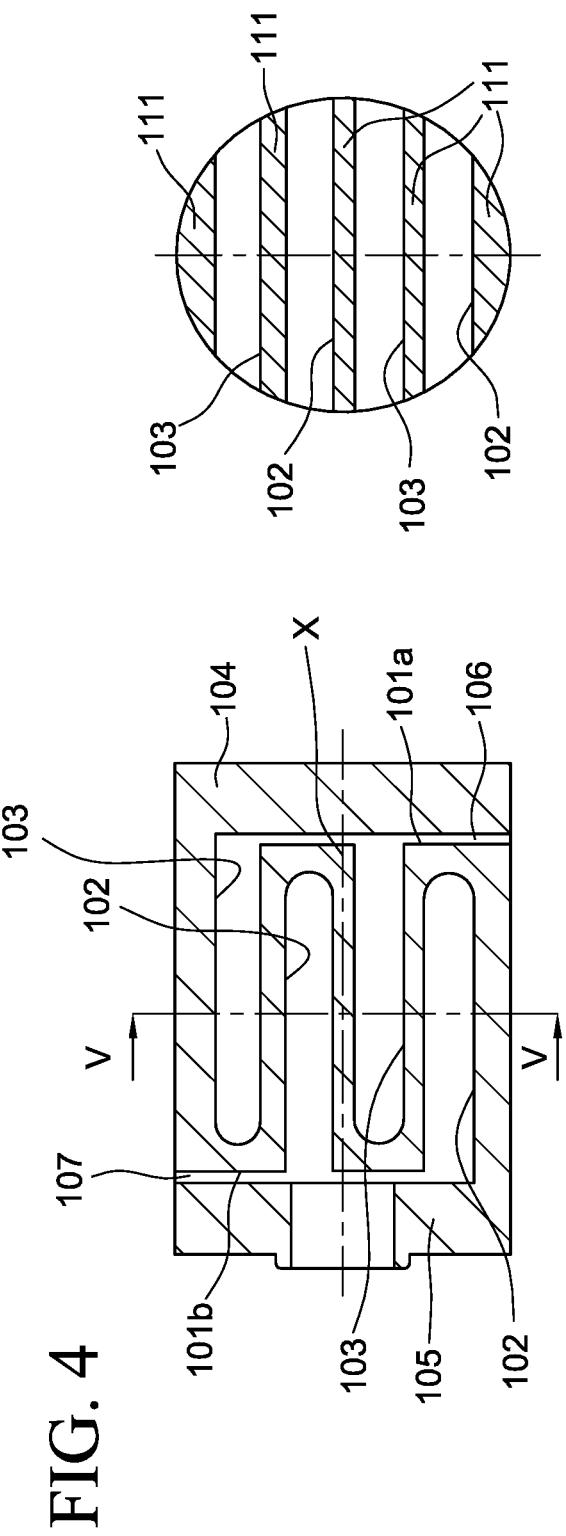
FIG. 4
FIG. 3
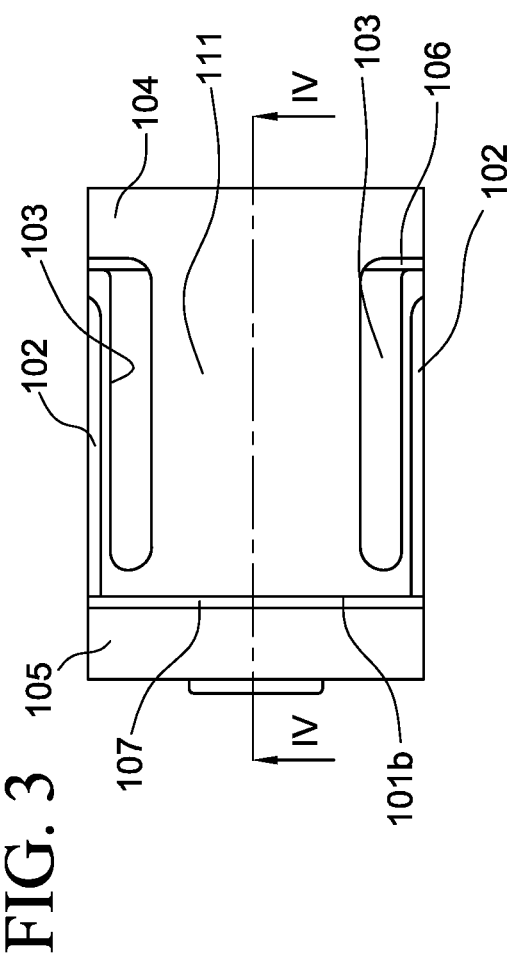
FIG. 5

TORSIONAL TRANSMISSION ELEMENT WITH ELASTIC RESPONSE

TECHNICAL FIELD OF THE INVENTION

The work leading to this invention has received funding from the European Union Seventh Framework Programme FP7/2007-2013, within the framework of the CYBERLEGs Project, grant agreement n° 287894.

The present invention regards a new configuration of a torsional spring that can be used in particular as a link adapted to transmit a torsion actuation with elastic response.

BACKGROUND OF THE INVENTION

In the field of robotics, and in particular in the field of wearable robotics, the use of elastic actuators is frequent (see, for example, Veneman et al., "A Series Elastic-and Bowden-Cable-Based Actuation System for Use as Torque Actuator in Exoskeleton-Type Robots", The International Journal of Robotics Research 2006 25: 261; Pratt et al., "The RoboKnee: An Exoskeleton for Enhancing Strength and Endurance During Walking", Proceedings of the 2004 IEEE International Conference on Robotics & Automation New Orleans, April 2004; Torres-Jara et. al, "A simple and scalable force actuator", Proceedings of 35th International Symposium on Robotics, Paris, France, 2004; and Paine et al., "A New Prismatic Series Elastic Actuator with Compact Size and High Performance"), wherein an elastic element is arranged between the actuator and the actuated mechanical element (see, for example, Pratt et al., "Series elastic actuators" in Proc. IEEE Intl. Conf. Intell. Robots Syst., Pittsburgh, Pa., 1995, pp. 339-406). For example, as described in U.S. Pat. No. 5,910,720, there are several reasons behind the use of this type of actuation especially in robotics. It definitely implies a series of advantages that can be summarised in the following points:

low exit impedance on the entire frequency spectrum;
possibility of controlling the exit impedance through software;
reducing the energy consumption;
high force/mass ratio;
high power/mass ratio;
inherent compliance in case of impact.

These types of actuators may be linear or rotary. Both types of actuators may be implemented with elastic linear or torsional elements (generally springs or assembled devices comprising springs).

One of the criticalities when it comes to implementing this type of actuators lies in the choice and construction or the elastic element.

The main specifications, which vary as a function of the application the actuators are used for, characterizing an elastic element to be used in an elastic actuators are:

Rigidity;
Maximum admissible load;
Admissible rotation or displacement;
Weight;
Overall dimension (shape).

With reference to the case of rotary actuators, whose field is a more specific object of the present invention, and thus elastic elements in which the transmission of a torsional stress is carried out, the prior art provides for various embodiments.

Generally speaking, a torsional elastic element may be obtained by using one of the following elements:

Wire helical torsional spring;
Machined (from an integral block) helical torsional spring;
Spiral torsional spring;
Mechanism which converts the linear spring action in a torsional response;
Torsional response custom element;

The use of wire helical torsional springs implies the following problems:

Low rigidity with respect to the requirements set by robotic applications;
Difficulty of interfacing with the elements in series therewith. The torque is transmitted through contact between an element and the wire of the spring which, in case of high deformations, slides on the surface of contact with the element;
Difficulty to obtain the bi-directionality of the response. In order to obtain an element capable of worling in both directions of rotation it is necessary to create a mechanism provided with at least two springs with ensuing increase of complexity, mass and dimensions;
Contact between coils during motion;
Remarkable overall bulk caused by the presence of spring lever arms.

The machined springs used as torsional springs overcome some of the aforementioned drawbacks (see, for example, Helical Products Company, Inc. http://www.heli-cal.com). Specifically, they are metal cylinders in which there is formed a helical recess with one or more principles, so that the cylinder takes on a helical shape.

One of the main advantages of this type of springs lies in the possibility of providing the ends thereof (to become interface areas with the elements to which they are fixed) with different shapes and with fixing systems which allow forming various couplings (threaded holes, threaded ends, notched profiles etc.).

However, alike the wire springs these springs have a preferential direction of rotation and this makes them not suitable for use in applications in which there is expected the application of torques in both directions of rotation and it is required an identical torsional response in both directions.

Also the use of spiral springs allows overcoming some drawbacks of the wire helical springs but there remains the impossibility to obtain a two-directional response without using more than one spring and a connection mechanism.

By using linear springs in an assembled device, which converts the linear response thereof into a torsional output response, there can be obtained a two-directional response with desired rigidity and transmissible torque characteristics. The drawbacks related to this type of solution mainly lie in the large overall dimension required for the implementation of the entire assembly.

Among known examples of torsional springs formed starting from a suitably machined metal element, with the aim of conferring the desired properties to the element, the one disclosed in Lagoda et al., "Design of an electric Series Elastic Actuated Joint for robotic gait rehabilitation training" Proceedings of the 2010 3rd IEEE RAS EMBS International Conference on Biomedical Robotics and Biomechatronics, The University of Tokyo, Tokyo, Japan, Sep. 26-29, 2010, is an elastic actuator used in walking rehabilitation. The elastic element used in the actuator is obtained from a plate-like steel body in which there are formed two spiral recesses. The element reveals some problems in connection with hysteresis, the contact between the coils that limits the applicable load and the relatively high difference between the rigidity simulated with FEM analysis and actual rigidity.

An embodiment analogous to the one described above is in Wang, Shiqian, et al. "Efficient Lightweight Series Elastic Actuation for an Exoskeleton Joint". The shape of the elastic element is generally similar to the previous one though with increased torsional rigidity and the attempt to overcome the problems of hysteresis and contact between turns. Stienen et al., "Design of a rotational hydro-elastic actuator for a powered exoskeleton for upper-limb rehabilitation," IEEE Trans. Biomed. Eng., vol. 57, no. 3, pp. 728-735, March 2010, discloses a spring similar to the previous ones used in a hydro-elastic actuator for the rehabilitation of an upper limb.

Another type of torsional spring obtained by machining a steel element is described in Sergi et. al, "Design and Characterization of a Compact Rotary Series Elastic Actuator for Knee Assistance During Overground Walking", in Proc. IEEE Int. Conf. on Biomed. Rob. and Biomech., pp. 1931-1936, 2012; in this case, a metal disc is excavated so as to obtain spokes in the shape of laminar coils which join a hub and an external rim. Being disc-shaped, this element has a high diameter/height ratio. The maximum torque applicable is limited by the occurrence of contact between the coils.

Patent publication WO2008US61560 discloses a torsional element in which the elastic response is obtained by joining two parallel flanges with S-shaped elements. The elements for joining the two flanges are bars folded and fixed to the elements for input and output of the torque in the system. According to a simplified variant, shown in US20070698811, the connection between the flanges for the input and output of the torque is obtained by using straight bars and not S-shaped ones. These are complex systems which require the assembly of a plurality of parts hence implying various complications. The connections between the elements must be stable and free of play, so as to avoid a torque transfer mode (angle/torque characteristic) not repeatable or different from the desired one, and the occurrence of unexpected stress potentially causing damage to the structure. In addition, the machining of all elements should be extremely accurate so as to avoid the occurrence of residue stresses after assembly which may modify the characteristic of the elastic element or reduce the resistance thereof.

Again, the aforementioned patent U.S. Pat. No. 5,910,720 shows a torsional spring obtained with an element having cross-shaped sections, and thus the use of plates as the basic torque transfer element. However, the cross represents a configuration of plates working substantially "in parallel", hence requiring, with the aim of obtaining a high transmissible torque/rigidity ratio, i.e. high transmissible torque but limited rigidity (high deformability), the use of very thin plates (excessive stresses) or the increase in the longitudinal dimension of the object (excessive overall dimension).

Another known torsional response element has a torsional property obtained by forming, on a cylindrical ring in charge of the transmission of the torque between an input element and an output element, a series of recesses that with a radial development define a plurality of segments, in turn developing according to radial planes, that is passing thorough the torsion axis. The whole device is realized in multiple parts that require a rigid and precise mutual connection. Moreover, obtaining the recesses in the radial directions requires to carry out a number of cuts on the ring body, with a resulting constructive complication deriving from the necessity of changing over and over the mutual placement between the body and the cutting tool. Furthermore, being the transmissive segments arranged in a ring-like body, they remain displaced from the torsion axis, and thus they tend to become deformed in flexion, realizing an unsatisfactory ratio between transmissible torque and rigidity.

SUMMARY OF THE INVENTION

The object of the present invention is to provide a compact torsional elastic element, provided with a linear angle/torque characteristic which is also not affected by the direction of rotation, and that is simple to obtain, allows avoiding unwanted contact between its parts, has high capacity of interfacing with the elements to which it should be connected, and is capable of attaining a high transmissible torque relative to its weight and overall dimension.

These and other objects are accomplished by the torsional spring according to the present invention, whose essential characteristics are defined in the first of the attached claims. Further important characteristics are defined by the dependent claims.

BRIEF DESCRIPTION OF THE DRAWINGS

The characteristics and advantages of the torsional spring according to the present invention shall be more apparent from the following description of its embodiments provided solely by way of non-limiting example with reference to the attached drawings, wherein:

FIG. 3 is a side view of the spring of FIG. 2;

FIG. 4 is a sectional view of the spring taken along lines IV-IV of FIG. 3; and

FIG. 5 is a sectional view of the spring taken along lines V-V of FIG. 4.

DETAILED DESCRIPTION OF THE INVENTION

With reference to the above figures, the elastic element according to the invention is represented by a typically metal element which, due to suitable machining, takes the characteristics of a torsional spring with the desired rigidity and transmissible torque properties. Typically, starting from a solid block integral body, material is taken away so as to obtain a distribution of recesses, as described hereinafter.

Figure 1:
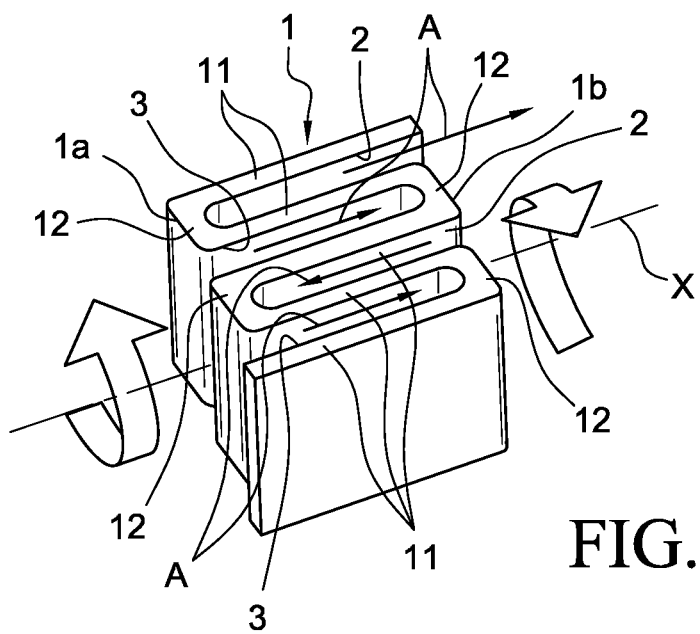
FIG. 1 shows in axonometric view a conceptual structure of the invention, which also represents a first and elementary embodiment.
Figure 2:
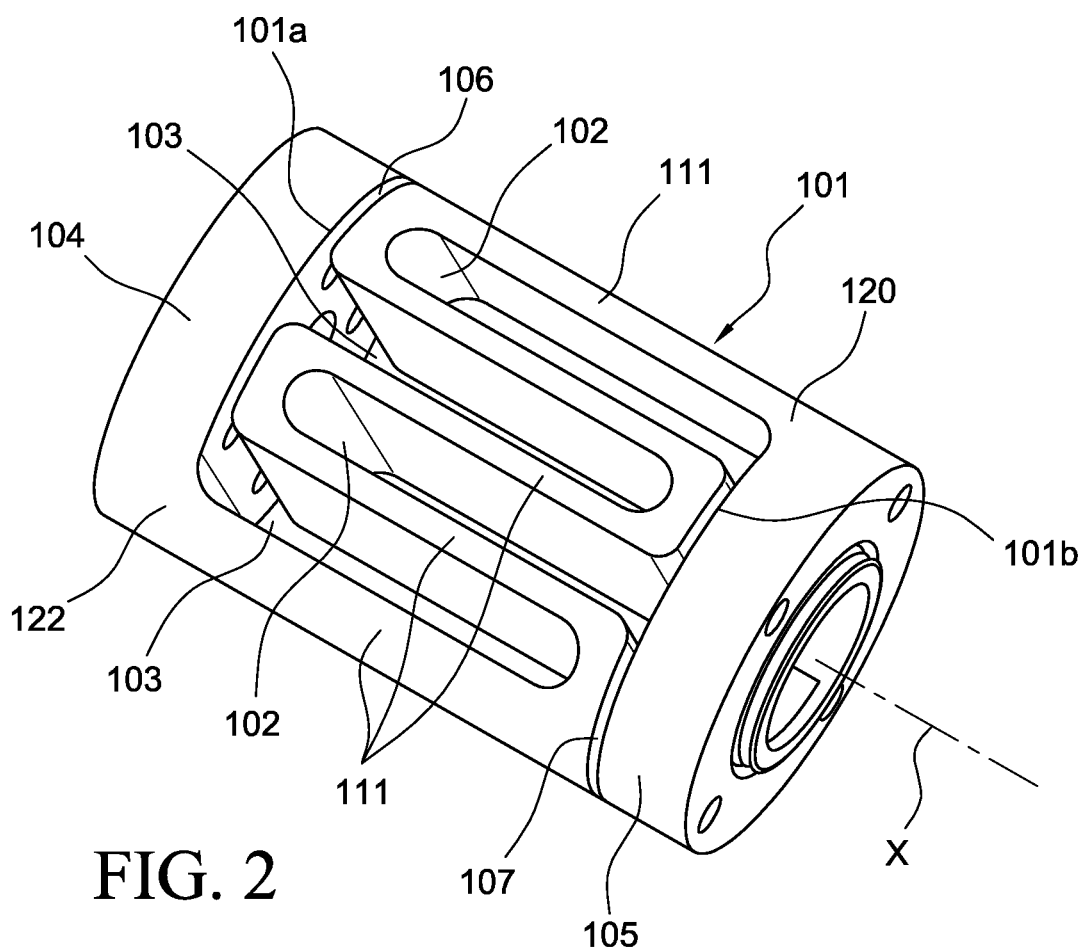
FIG. 2 shows in axonometric view a second embodiment of the spring according to the invention.

In particular, referring now only to FIG. 1, a body 1 is in this case parallelepiped-shaped, and has an axis X which centrally traverses the body and which represents the centre axis of the torque or moment of torsion which is intended to be transmitted (between actuator and load) by making use of the body itself. Such axis shall be physically defined as the line that joins two opposite attachments formed in the body or associated therewith, not shown in this case, for connecting the body to the actuator and to the actuated element, in turn not represented. The connection is carried out with the assistance of suitable bearings for isolating the body from any stress different from the torsional stress. The opposite sides corresponding to the sides of attachment are indicated with 1a and 1b.

According to the invention, the body 1 has recesses 2, 3 mainly developing according to planes A with a parallelism relationship with respect to the axis X, which in case the body is parallelepiped-shaped may also be identified as parallel, besided to each other, also to the lateral faces of the parallelepiped. Preferably the distribution of recesses 2, 3 has a symmetry with respect to a plane orthogonal to the planes A and passing through the axis X, and also a substantial symmetry, from a dimensional point of view, with respect to a plane orthogonal to the planes A and crossing an intermediate point of the body 1 (intermediate point intended with respect to the elongation along the torsion axis X).

Still according to a preferred solution, the recesses 2, 3 are through recesses, i.e. open on three sides where the closure side is, for the various parallel and superimposed recesses, from time to time and alternatively on either of the attachment surfaces 1a and 1b. The recesses 2 are those of the type closed on the side 1a, while the recesses 3 are of the type closed on the opposite side. In practice, due to such configuration, the body 1 takes a serpentine developing shape, where sectioned orthogonal to the planes A and to the two faces 1a, 1b, determined by plate-like segments 11 spaced by the thickness (measurement in the direction orthogonal to the planes A) of the recesses 2, 3. The junctions between the segments 11, that close the recesses on the sides 1a, 1b, are indicated with 12.

The resulting torsional behaviour is definitely similar to that of a plate with length equivalent to the sum of the lengths (size along X) of the various plate-like segments 11, but with the difference lying in the fact that the junctions 12 stiffen the structure with respect to the equivalent plate. A further difference in the response lies in the fact that in a hypothetical equivalent spring made using a single plate, the material is entirely astride the torsion axis, while in case of the serpentine shape the most peripheral plate-like segments are in a state of non-purely torsional stress and they cause a more rigid global response.

The compactness of the obtained structure, especially in axial direction, is then as such a substantial advantage, the desired rigidity being optimisable by acting on various geometrical parameters such as in particular the thickness of the segments 11, the height-wise dimensions thereof, i.e. their size over the planes A orthogonally to X, and the length-wise dimensions, i.e. the size over the planes A parallel to X. In particular, the rigidity of the element increases as the thickness and height increases and reduces as the axial length of the entire structure increases.

Obviously, a fundamental variant for obtaining the desired characteristics lies in the materials used; the most suitable materials are the metals generally used in mechanical constructions. They include steel, aluminium alloys and titanium alloys. Primarily, there may be identified in the Young's modulus of the selected material, the fundamental parameter for obtaining the desired rigidity characteristics of the element. Besides the desired rigidity, the selection of the material to be used directly follows the amount of load that the spring should be capable of bearing and the degree of dimensional compactness to be obtained. The elbow junctions 12 between the plate-like segments 11 represent the areas of concentration of the tensions; the higher the resistance of the material, the narrower the recess between the two consecutive segments shall be, and the smaller the overall thickness of the element (as mentioned, the thickness being intended as the dimension in the direction orthogonal to the planes A).

With reference to FIGS. 2 to 5, a second embodiment of the torsional spring according to the invention provides for a cylindrical body 101 instead of a parallelepiped one. The serpentine configuration with recesses 102, 103 and plate-like segments 111 is however entirely similar to the previous one, also in this case comprising plate-like segments parallel to each other and to axis X, save for the fact that the segments clearly do not have a uniform height like in the previous case, but they reduce in respect of this size as they move away from the axis X, due to the circular curvature of the body.

Moreover, in this embodiment, the thickness of the segments 111 is not constant but (FIGS. 4 and 5) it increases progressively for the most peripheral segments, with the aim of harmonising the tensions in the material due to the torsion. Indeed, the peripheral segments must bear greater specific stresses, due to the nature of the torsion stress, and as also mentioned above they have a smaller height with respect to the central ones.

This embodiment further comprises two flanged attachments 104, 105, respectively on the sides 101a, 101b, in turn obtained in the same solid block body due to two crosswise cuts 106, 107 which—on the cylinder 101—practically separate the portion of the actual serpentine from the ends of the cylinder, forming two disc-shaped portions which are then suitably machined to make them adapted to the required mechanical junctions. The crosswise cuts stop before entirely cutting the cylinder section, leaving respective connection bridges 120, 122 between the portion of the serpentine and the discs. Advantageously, such bridges are in diametrically opposite positions.

Specifically, the recesses and the notches can be obtained through wire electro-erosion on a maraging steel bar (Böhler W720, Young's module: 193 GPa, yield stress of 1815 MPa). Compatibly with the dimensions of the recesses and with the dimension of the section of the entire element the machining can be obtained by chip removal machining. A spring thus obtained, having an angle/torque characteristic that is linear and free of hysteresis, is adapted to attain a torsional rigidity of 100 N·m·rad$^1$ and transmissible torque of at least 30 N·m.

The ends of the serpentine element may be formed in various ways adapted to allow interfacing the deformable element with the various types of mechanical elements, obviously according to what can be implemented by a man skilled in the art. Junctions/fixing elements that can be used may include flanged junctions with screws, shaft/hub junctions, notched profiles, keys, tabs, radial pins, spline elements etc.

Thus, the present invention allows overcoming the difficulties of implementing a torsional elastic element that is compact, robust and relatively light, and which simultaneously allow transmitting high torques with high deformability, thanks in particular to the arrangement with recesses (and segments) parallel to each other and to the torque center axis. The realization in a single piece avoids any unwanted contact between movable parts during use, and the element is also easy to interface with the parts to which it should be connected.

Other advantages that can arise from the use of the torsional spring according to the invention comprise:
  easy parametrisation of the dimensions with the aim of obtaining springs with the desired characteristics;
  possibility of designing the ends of the spring to use various fixing methods between the spring and the elements to be connected thereto;
  possibility of obtaining the machining directly on a shaft thus making it inherently elastic.

The spring is mainly applied in the field of robotics and in particular wearable robotics. The dimensions, the rigidity and transmissible torque characteristics thereof and its high capacity to interface with the other elements, make the present invention useful for obtaining elastic actuators for wearable robots and for robots in general. Actually, in these applications it is fundamental to use actuators with limited weights and overall dimensions while satisfying the need of transmitting relatively high torques and forces. The elastic actuator according to the invention, complete with all the elements, may be assembled directly on the robot. The applicability of the spring is not however limited to the field of robotics but it can also be extended to all fields that require the use of torsional springs with given rigidity and transmissible torque characteristics.

The present invention has been described with reference to preferred embodiments thereof. However, there can be provided other embodiments of the same inventive concept, falling within the scope of protection of the following claims.

The invention claimed is:

1. A transmission element having a center axis and comprising:
    a block body;
    a plurality of through recesses formed in the block body, the through recesses being generally parallel and superimposed mainly according to recess planes with a parallel relationship with respect to the center axis, the through recesses spacing a plurality of plate-like segments of the block body, the plate-like segments being parallel with each other and alternately connected by junctions on a first side and a second side of the block body;
    wherein the through recesses are alternately closed by the junctions on the first and second sides of the block body, the first and second sides of the block body being opposite each other along the center axis, the plurality of through recesses defining a serpentine portion comprising the plurality of plate-like segments spaced by a thickness of the through recesses;
    wherein the transmission element is arranged for providing an elastic response for transmission of a torsional stress between an actuating element and an actuated element;
    further comprising attachments for the actuating element and the actuated element formed in, or associated with, the block body in opposed positions aligned along a center axis of the torsion stress;
    wherein the attachments to the actuating element and the actuated element correspond respectively to the first and second sides of the block body, the serpentine portion having ends connected respectively with the attachments to the actuating element and the actuated element via connection bridges at opposite sides of the center axis of the transmission element;
    wherein the block body is cylindrically shaped from a metal material;
    wherein the attachments to the actuating element and the actuated element are disc-shaped as a result of respective crosswise cuts formed in the cylindrically-shaped block body to separate the serpentine portion from axial ends of the cylindrically-shaped block body, the crosswise cuts leaving the respective connection bridges connecting the serpentine portion to the disc-shaped attachments;
    wherein a thickness of the plate-like segments progressively increases as the plate-like segments are positioned farther away from the center axis.

2. The transmission element of claim 1, wherein the connection bridges are in diametrically opposed positions.

3. The transmission element of claim 1, wherein the through recesses are formed through cutting away material from an integral block.

4. The transmission element of claim 1, wherein a thickness of the junctions is greater than a thickness of the plate-like segments.

5. The transmission element of claim 1, wherein the junctions connecting the plate-like segments define areas of concentration of tension such that the higher the resistance of material forming the junctions, the narrower the through recesses are defined between adjacent plate-like segments.

6. The transmission element of claim 1, wherein the plate-like segments have a uniform height.

7. The transmission element of claim 1, wherein the block body is a solid block integral body such that the through recesses are defined by areas of material removed from the block body.

8. A transmission element having a center axis and comprising:
    a block body;
    a plurality of through recesses formed in the block body, the through recesses being generally parallel and superimposed mainly according to recess planes with a parallel relationship with respect to the center axis, the through recesses spacing a plurality of plate-like segments of the block body, the plate-like segments being parallel with each other and alternately connected by junctions on a first side and a second side of the block body;
    wherein the through recesses are alternately closed by the junctions on the first and second sides of the block body, the first and second sides of the block body being opposite each other along the center axis, the plurality of through recesses defining a serpentine portion comprising the plurality of plate-like segments spaced by a thickness of the through recesses;
    first and second flanged attachments on opposed first and second sides of the junctions;
    wherein the first and second flanged attachments are spaced apart from the junctions by first and second crosswise cuts, respectively.

9. The transmission element of claim 8, wherein the transmission element forms a cylinder.

10. The transmission element of claim 9, wherein the first and second crosswise cuts extend short of extending through an entirety of the cylinder.

* * * * *